(12) United States Patent
Masukawa et al.

(10) Patent No.: US 7,083,842 B2
(45) Date of Patent: Aug. 1, 2006

(54) HONEYCOMB STRUCTURE AND PROCESS FOR PRODUCTION THEREOF

(75) Inventors: Naoshi Masukawa, Nishikasugai-gun (JP); Shuichi Ichikawa, Handa (JP); Takashi Harada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 135 days.

(21) Appl. No.: 10/490,254

(22) PCT Filed: Jul. 28, 2003

(86) PCT No.: PCT/JP03/09536

§ 371 (c)(1),
(2), (4) Date: Mar. 22, 2004

(87) PCT Pub. No.: WO2005/009614

PCT Pub. Date: Feb. 3, 2005

(65) Prior Publication Data

US 2005/0025933 A1    Feb. 3, 2005

(51) Int. Cl.
*B32B 3/12* (2006.01)
(52) U.S. Cl. .............. 428/116; 428/34.4; 428/188; 428/220; 428/689; 428/698; 428/702
(58) Field of Classification Search ............... 428/116, 428/34.4, 188, 220, 689, 698, 702
See application file for complete search history.

(56) References Cited

FOREIGN PATENT DOCUMENTS

| | | | |
|---|---|---|---|
| JP | B2 7-4534 | | 1/1995 |
| JP | B2 2604876 | | 1/1997 |
| JP | B2 2613729 | | 2/1997 |
| JP | A 2001-329836 | | 11/2001 |
| JP | A 2002-70545 | | 3/2002 |
| JP | WO-02/081057 | * | 10/2002 |
| JP | A 2002-326034 | | 11/2002 |

* cited by examiner

*Primary Examiner*—Ling Xu
(74) *Attorney, Agent, or Firm*—Oliff & Berridge, PLC

(57) ABSTRACT

There is disclosed a honeycomb structure in which a positional deviation is not easily occurred by vibration or the like in the honeycomb structure held in a can, of which the strength reduction is small and which can be easily produced, and a process for production of the structure. The honeycomb structure 1 comprises a cell structure portion 20 constituted of partition walls 2 arranged so as to form a plurality of cells 3 extending through an axial direction, and an outer peripheral wall 7 disposed in an outer periphery of the cell structure portion 20. A surface roughness Ra of an outer peripheral surface of the outer peripheral wall is 1 to 80 μm.

13 Claims, 6 Drawing Sheets

US 7,083,842 B2

HONEYCOMB STRUCTURE AND PROCESS FOR PRODUCTION THEREOF

TECHNICAL FIELD

The present invention relates to a honeycomb structure, which can be preferably used for, for example, a carrier for a catalyst having a catalytic function used in internal combustion engine, boiler, chemical reactor, reformer for fuel cell, etc., or for a filter for trapping particulate matter presenting in an exhaust gas, and relates to a process for production thereof. The present invention particularly relates to a honeycomb structure of which a position does not easily deviate by vibration during use of the honeycomb structure held in a can or the like, and a process for production of the honeycomb structure.

BACKGROUND ART

Honeycomb structures are used as, for example, a catalyst carrier for an internal combustion engine, boiler, chemical reactor, fuel cell reformer, etc. and a filter for trapping particles presenting in an exhaust gas, particularly particles emitted from a diesel engine (this filter is hereinafter referred to as DPF).

This honeycomb structure is aimed to have a higher porosity, thinner partition walls, and a larger size in order to reduce a pressure loss and to enhance a treatment capability, and this direction degradates strength and dimensional precision of the honeycomb structure. Therefore, some kind of reinforcement is required depending on the cases.

To solve the problem, the method of improving the dimensional precision has been proposed in J-P-B-2604876, and the proposed method comprises that a ceramic honeycomb fired body is prepared, a peripheral edge portion of the ceramic honeycomb fired body is removed, and an outer wall portion is formed on the outer peripheral surface of the fired body. A honeycomb structure having an outer shell layer formed in the same manner as described above is disclosed in J-P-B-2613729 which further discloses that the outer shell layer is made of cordierite and colloidal silica or the like.

The honeycomb structure is often held in a can via a holding member, and connected to an exhaust line of an internal combustion engine or the like. When the structure is mounted on an automobile or the like, there is a risk that a position of the honeycomb structure in the can deviates by strong vibration or an exhaust gas pressure. When the position deviates, there is also a risk that the honeycomb structure does not sufficiently function.

To solve the problem, a ceramic honeycomb structure disclosed in J-P-A-7-4534 is characterized by that a stepped portion is disposed by projecting or denting at least a portion of an outer wall, and the surface of a projecting or denting portion is rougher than another outer surface. A canning structure of the ceramic honeycomb structure is described in JP-A-2000-70545 in which the honeycomb structure having concave/convex portions on the outer peripheral surface is held in a tubular casing. It is also described that a surface roughness Ra of a concave/convex surface is preferably 0.1 to 0.5 mm.

However, when the surface roughness is excessively large, the strength of the corresponding portion sometimes drops. In the above-described technique, a specific process or a specific device is required for making the concave/convex portion, thus a production process is complicated.

DISCLOSURE OF THE PRESENT INVENTION

The present invention intends to provide a honeycomb structure of which a position does not easily deviate in a can by vibration or an exhaust gas pressure, of which the strength does not drop significantly, and which can be easily produced, and a process for production of the structure.

The present invention provides a honeycomb structure comprising: a cell structure portion constituted of partition walls arranged so as to form a plurality of cells extending through an axial direction; and an outer peripheral wall disposed in an outer periphery of the cell structure portion; wherein a surface roughness Ra of an outer peripheral surface of the outer peripheral wall is in a range of 1 to 80 μm.

In the present invention, the surface roughness Ra is preferably in a range of 1 to 50 μm, and the surface roughness Ra is preferably a surface roughness of the outer peripheral surface in the axial direction. At least a part of an inner peripheral surface of the outer peripheral wall is preferably closely attached to a partition wall surface. The cell structure portion is preferably monolithically formed and the outer peripheral wall is preferably disposed in at least a part of the outer periphery of the cell structure portion. The cell structure portion also preferably consists of a plurality of separately formed segments and the outer peripheral wall is preferably disposed in at least a part of the outer periphery of the cell structure portion. Some of the cells are preferably plugged at an end face of the honeycomb structure. A main crystal phase of the cell structure portion is preferably made of at least one selected from a group consisting of cordierite, mullite, alumina, aluminum titanate, lithium aluminum silicate, silicon carbide, silicon nitride and a silicon carbide-metal silicon composite phase. The outer peripheral wall is preferably made of a material containing at least one raw material selected from a group consisting of colloidal silica, colloidal alumina, ceramic fiber, and ceramic particles.

The present invention also provides a process for production of a honeycomb structure comprising a cell structure portion constituted of partition walls arranged so as to form a plurality of cells extending through an axial direction, and an outer peripheral wall disposed in an outer periphery of the cell structure portion. The above method comprises the following steps: a clay preparation step of preparing a clay from a forming material containing a raw material for forming a main crystal phase of the partition wall and a binder; a forming step of forming the clay prepared from the forming material into a formed body having a honeycomb shape; a firing step of firing the formed body to obtain a fired body; a removing step of removing at least a part of the outer periphery of the fired body to form the cell structure portion; and coating step of applying a coating material at least to a part of the outer periphery of the cell structure portion to form at least a part of the outer peripheral wall, wherein a surface roughness Ra of an outer peripheral surface in the outer peripheral wall formed in the coating step is set in a range of 1 to 80 μm.

In the coating step in the present invention, the surface roughness Ra of the outer peripheral surface in the axial direction is preferably set to 1 to 80 μm, and the coating step preferably includes a step of drying the coating material at a temperature of 150 degree C. or higher after applying the coating material. The process preferably includes a bonding step of bonding a plurality of formed or fired bodies. In the coating step of the present invention, the coating material preferably contains particles having an average particle diameter of 0.5 to 100 μm, and also preferably contains a fiber having an average fiber length of 10 to 100 μm.

BEST MODE FOR CARRYING OUT THE INVENTION

A honeycomb structure and a process for production thereof according to the present invention are described below in detail with reference to the concrete embodiments. However, the present invention is not restricted to the following embodiments.

Figure 1A:
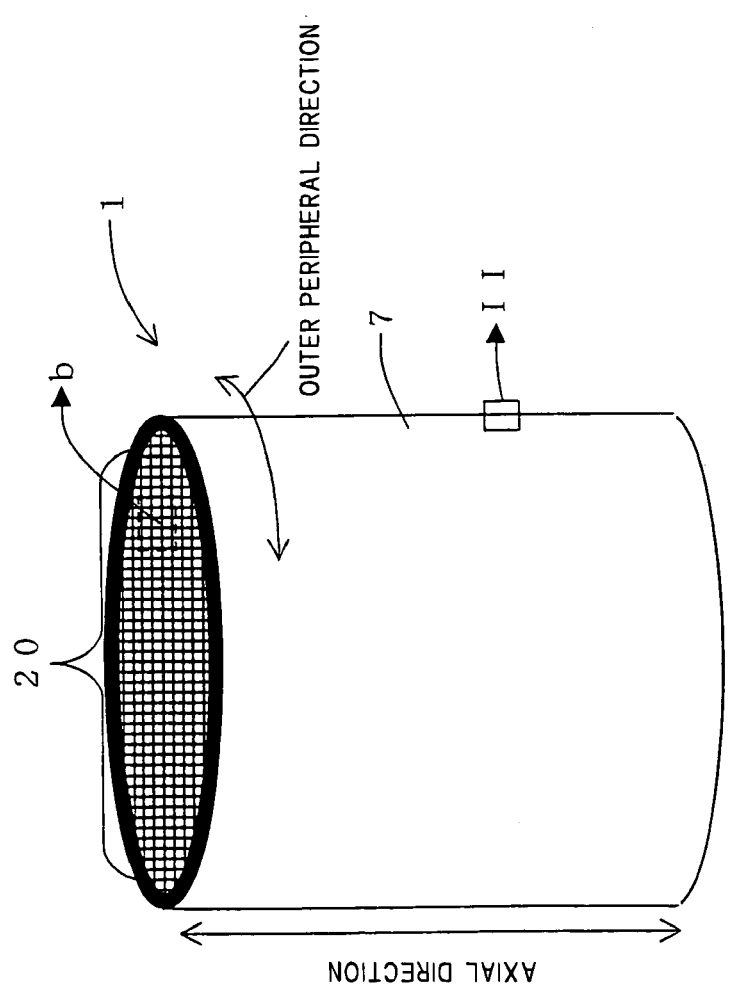
FIG. 1(a) is a schematic perspective view showing one embodiment of a honeycomb structure of the present invention.
Figure 1B:
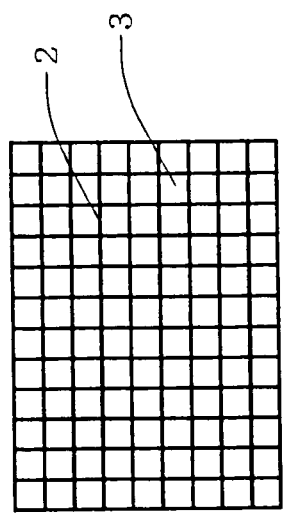
FIG. 1(b) is a partially enlarged view of the portion b of FIG. 1(a).
Figure 3:
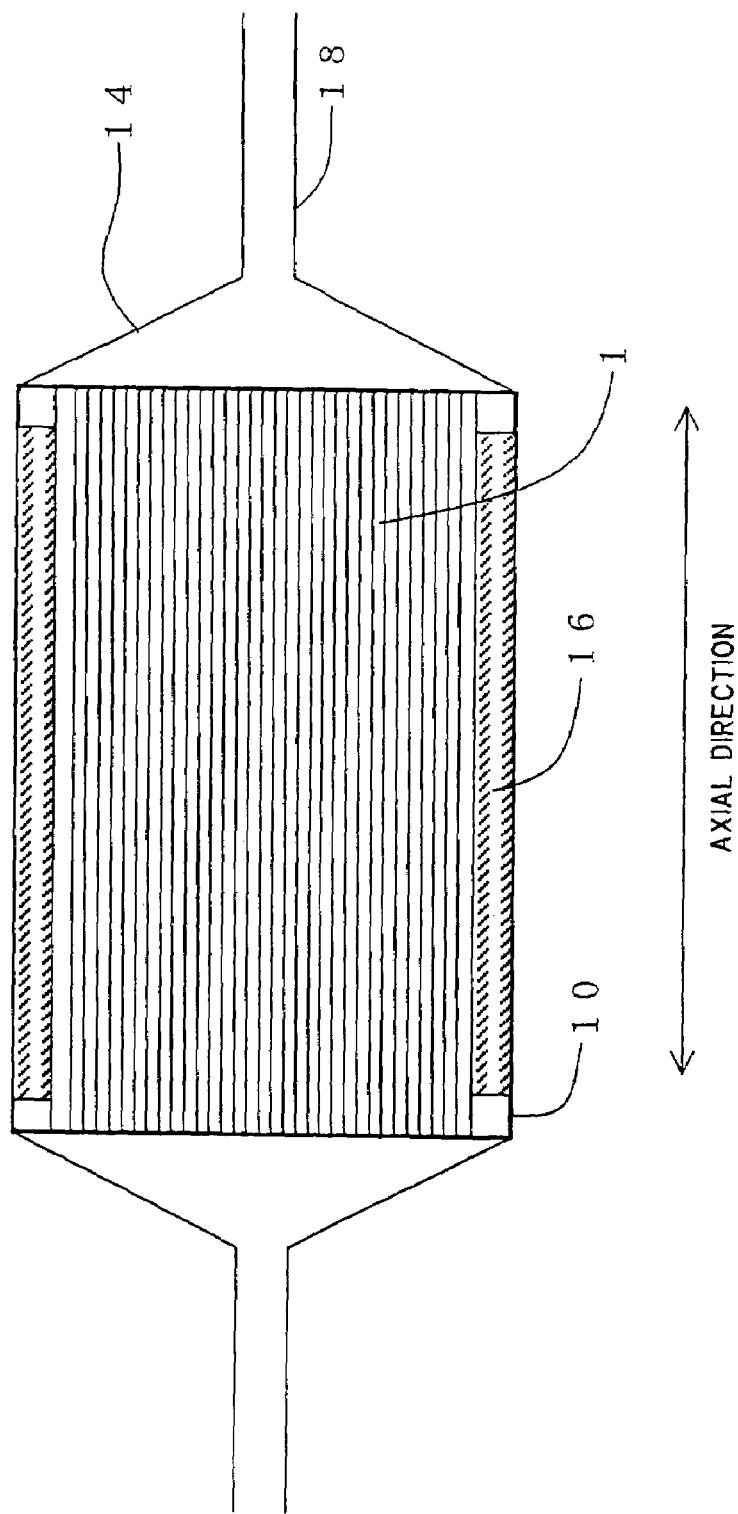
FIG. 3 is a schematic sectional view of one example showing the honeycomb structure of the present invention being held in a can and installed to an exhaust line.

As shown in FIGS. 1(a) and 1(b), a honeycomb structure 1 of the present invention includes a cell structure portion 20 constituted of partition walls 2 arranged so as to form a plurality of cells 3 extending through an axial direction, and an outer peripheral wall 7 disposed in an outer periphery of the cell structure portion 20. Important characteristics of the present invention lie in that the surface roughness Ra (the surface roughness Ra is hereinafter referred to as Ra) in an outer peripheral surface 71 of the outer peripheral wall 7 is in a range of 1 to 80 μm. When the honeycomb structure having Ra of the outer peripheral wall in this range is held in a can as shown in FIG. 3, a positional deviation caused by vibration or the like is inhibited, and consequently breakage of the honeycomb structure caused by the positional deviation can be inhibited. When Ra of the outer peripheral wall is in this range, a sufficient strength can be also maintained for the outer peripheral wall.

When Ra of the outer peripheral wall is set to be very large, for example, at 100 μm or more, a special process or a special device is required to provide very large Ra, and this complicates the production process, although the positional deviation can be inhibited. As a method of increasing Ra in a simple process, particles having a large particle diameter can be also used in a material for forming the outer peripheral wall. However, it was found that a bonding strength between the outer peripheral wall and the cell structure portion drops, and the outer peripheral wall easily peels, when the particles having such a particle diameter which sets Ra at 100 μm or more are used to form the outer peripheral wall. When an upper limit of Ra of the outer peripheral wall is set to an appropriate value, for example, 80 μm, preferably 50 μm, further preferably 30 μm, a sufficient effect of inhibiting the positional deviation is obtained. Moreover, it was found that a bonding strength sufficient to prevent the outer peripheral wall from peeling can be obtained by forming the outer peripheral wall using the particles having such an average particle diameter which sets Ra in this range. That is, it was found that the honeycomb structure which has a sufficient strength and inhibits the positional deviation can be obtained without using any special process or device to set Ra in a specific range.

On the other hand, when Ra of the outer peripheral wall is excessively small, a sufficient friction to inhibit the positional deviation cannot be obtained. Therefore, Ra needs to be 1 μm or more. In the present invention, it is preferable that Ra of the outer peripheral wall is in the above-predetermined range over the substantially entire outer peripheral surface of the outer peripheral wall. However Ra does not have to be in the predetermined range at the entire outer peripheral surface. It is possible to achieve the effect of the present invention even when Ra falls within the predetermined range only at a part of the outer peripheral surface.

When the honeycomb structure 1 is held in a can 10 via a holding member 16 and installed to an exhaust line 18 of an automobile or the like as shown in FIG. 3, positional deviations in peripheral and axial directions may occur by a vibration or an exhaust gas pressure. A connection portion 14 for connecting the can 10 to the exhaust line 18 generally has a coned shape. Therefore, when the honeycomb structure 1 deviates in the axial direction, the honeycomb structure 1 contacts the connection portion 14, and easily fails. The breakage of the honeycomb structure can be effectively inhibited by setting Ra of the axial direction in the above-described range. The surface roughness of the peripheral direction is basically equal to that of the axial direction. When Ra is set in the above-described range, the positional deviation in the peripheral direction can be inhibited more effectively. When the outer peripheral wall is formed thin, concave/convex pattern can be made in the peripheral direction by an influence of the partition wall of an outer peripheral portion as shown in FIG. 4(b), and this is sometimes effective for inhibiting the positional deviation.

Ra means an arithmetic average roughness measured in a predetermined direction according to ISO4287/1, and is calculated as an average value of absolute deviations of the concave/convex surface portions from an average line. Ra in the axial direction means Ra calculated as described above from a data set measured in parallel with the axis, and Ra of the peripheral direction means Ra calculated as described above from a data set measured perpendicularly to the axis.

Figure 4A:
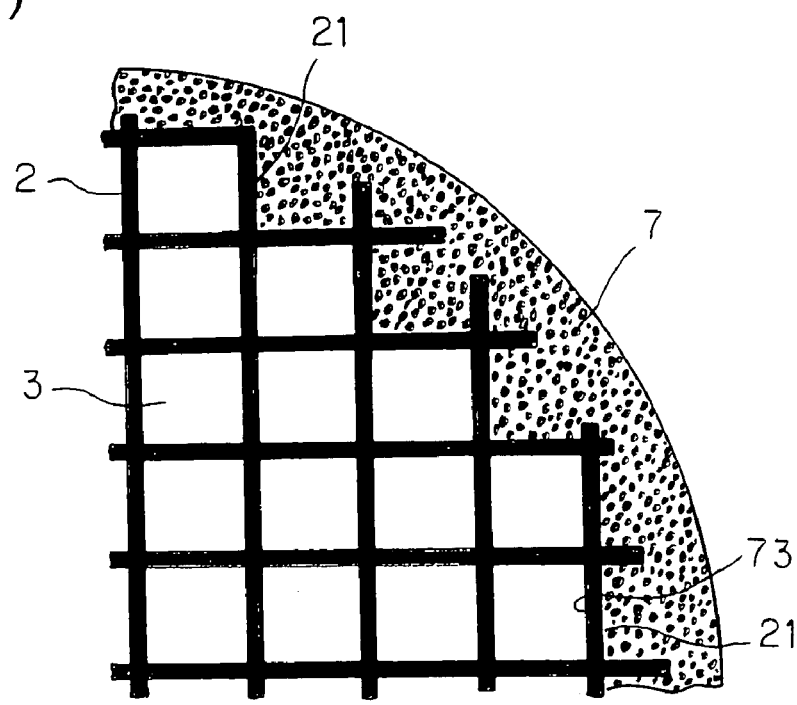
FIG. 4(a) is a partially enlarged schematic plane view showing a part of an end face of the honeycomb structure of the present invention.
Figure 4B:
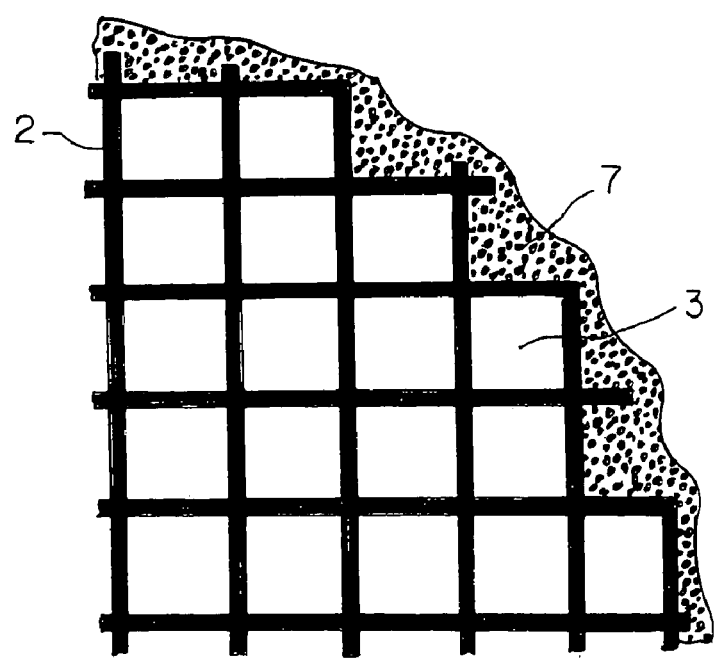
FIG. 4(b) is a partially enlarged schematic plane view showing another embodiment of the honeycomb structure of the present invention in the end face.

In the present invention, as shown in FIG. 4(a), an inner peripheral surface 73 of the outer peripheral wall 7 is closely attached to a partition wall surface 21. With this structure, even when the partition wall is thin or the honeycomb structure is large-sized, the strength of the outer peripheral wall can be increased, and a sufficient strength can be imparted to the honeycomb structure. In the present invention, at least a part of the inner peripheral surface 73 shall be closely attached to the partition wall surface 21, and it is preferable that all of the inner peripheral surface 73 is closely attached to the partition wall 2.

In one preferable example of the honeycomb structure of the present invention, the cell structure portion 20 is monolithically formed as shown in FIG. 4(a), and the outer peripheral wall 7 is disposed in at least a part or preferably all of the outer periphery of the cell structure portion 20. With this constitution, a raw material or a particle diameter of the outer peripheral wall may be different from that of the cell structure portion, and a range of selection of both materials is broadened. The material of the outer peripheral wall can be selected from such a standpoint that Ra is set to a preferable range, and Ra of the outer peripheral surface in the axial direction can be comparatively easily set to the range of the present invention. Furthermore, it is easy to closely attach the inner peripheral surface 73 of the outer peripheral wall 7 to the partition wall 2, and the sufficient strength can be imparted to the honeycomb structure.

Figure 5A:
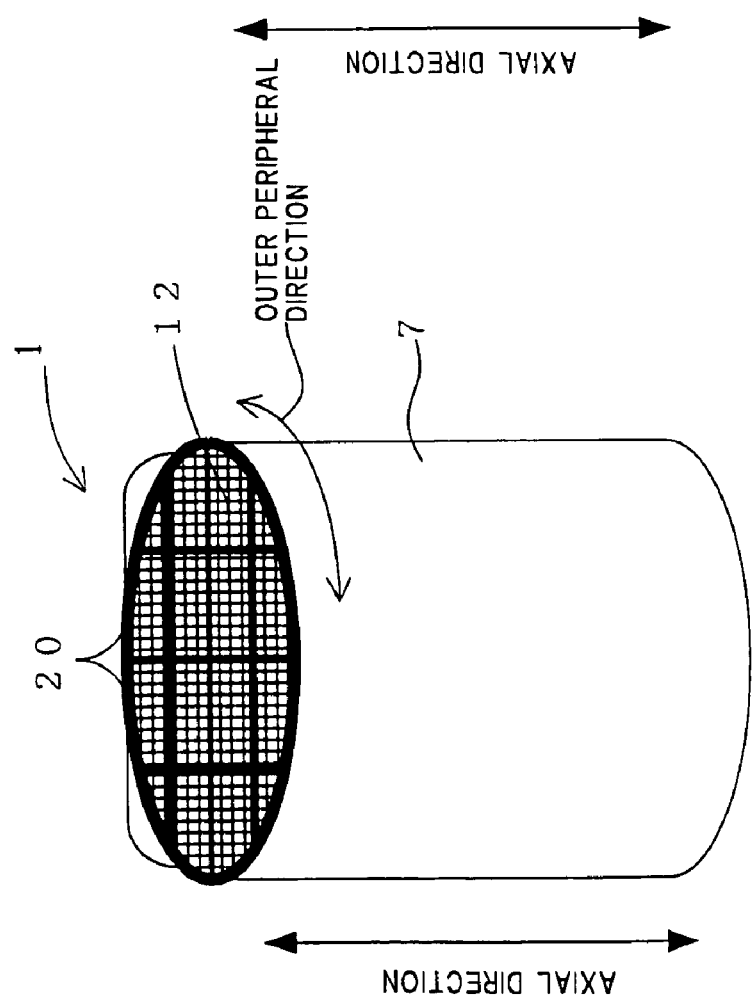
FIG. 5(a) is a schematic perspective view showing another embodiment of the honeycomb structure of the present invention.
Figure 5B:
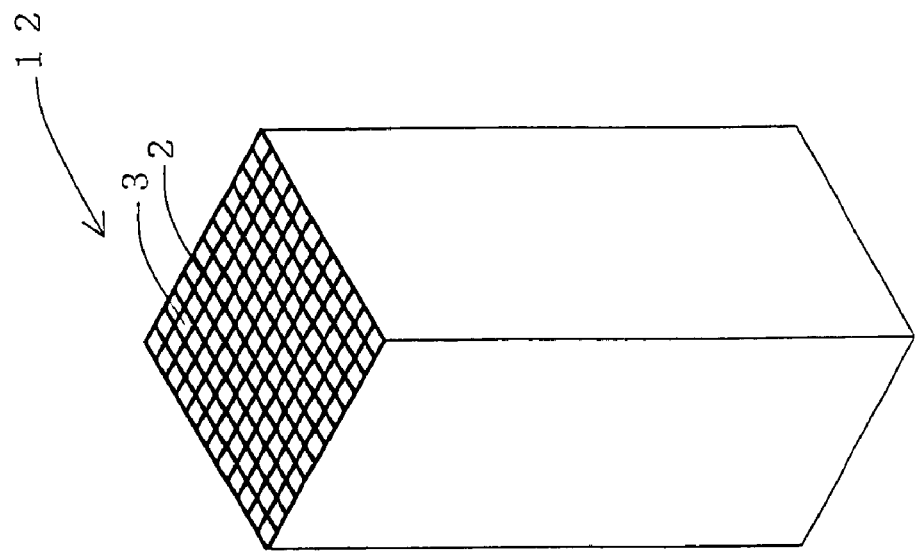
FIG. 5(b) is a schematic perspective view showing one embodiment of a segment which is a component of the honeycomb structure.

In another preferable example, as shown in FIGS. 5(*a*) and 5(*b*), the cell structure portion 20 is formed of a plurality of separately formed segments 12, and the outer peripheral wall 7 is disposed in at least a part or preferably all of the outer periphery of the cell structure portion 20. With this constitution, the sufficient strength can be imparted to the honeycomb structure, and a thermal shock resistance can also be improved. In this case, a size of the segment 12 is not restricted. However, when each segment is excessively large, an effect of improving the thermal shock resistance will be limited. When the segment is excessively small, production process of each segment or bonding process of each segment will be disadvantageously complicated. The preferable size of the segment differs with the thermal shock resistance of the material. For example, for cordierite or aluminum titanate, having a low thermal expansion coefficient and a high thermal shock resistance, a sectional area may be 900 to 62500 $mm^2$, preferably 2500 to 40000 $mm^2$. For alumina or silicon carbide having a high thermal expansion coefficient and a low thermal shock resistance, the sectional area may be 900 to 10000 $mm^2$, preferably 900 to 5000 $mm^2$. It is preferable that the segments having this size constitute 70% by volume or more of the honeycomb structure before removing the outer periphery. There is no particular restriction as to a shape of each segment. For example, a rectangular sectional shape as shown in FIG. 5(*b*), that is, a quadratic prism shape of the segment 12 may be a basic shape, and the shape of the segment on an outer peripheral side can be appropriately selected in accordance with the shape of the integrated honeycomb structure. After the segments having the basic shape are bonded and integrated, the outer periphery may be ground to form a desired shape of the honeycomb structure.

Figure 6:
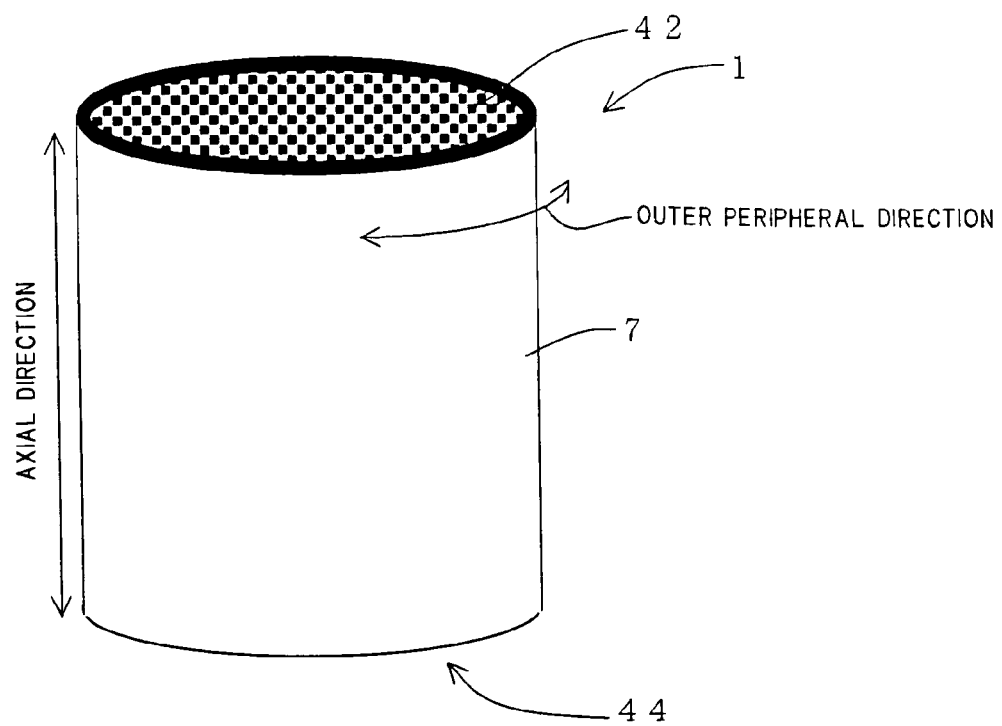
FIG. 6 is a schematic perspective view showing another embodiment of the honeycomb structure of the present invention.

When the honeycomb structure of the present invention is used as a filter, as shown in FIG. 6, some of the cells are preferably plugged at an end face 42 or 44 of the honeycomb structure. Especially, the cells are preferably plugged so that adjacent cells are alternately plugged at opposite end faces to each other, and the end face is preferably plugged in a checkered pattern. By such plugging, a subject fluid entering to, for example, one end face 42 of the structure passes through partition walls 2 and leaves from the other end face 44. In this case, the partition walls 2 function as a filter and an intended substance can be removed when the fluid passes through the partition walls.

In the present invention, a main crystal phase of the cell structure portion, that is, the partition wall, is preferably at least one selected from a group consisting of cordierite, mullite, alumina, aluminum titanate, lithium aluminum silicate, silicon carbide, silicon nitride and a silicon carbide-metal silicon composite phase considering strength, heat resistance or the like. When the honeycomb structure of the present invention is used in DPF, silicon carbide or silicon-silicon carbide based composite phase is especially preferable for the main crystal phase of the partition wall because of the high heat resistance, and cordierite is especially preferable for the main crystal phase because of the low thermal expansion coefficient and high thermal shock resistance. The term "main crystal phase" means a crystal phase constituting 50% by mass or more, preferably 70% by mass or more, more preferably 80% by mass or more of a crystal phase of the partition walls. In the present invention, for the honeycomb structure formed of metal silicon (Si) and silicon carbide (SiC), if an Si content defined by Si/(Si+SiC) is excessively low in case of the honeycomb structure made of metal silicon (Si) and silicon carbide (SiC), the strength of the honeycomb structure will be low due to the limited effect of Si addition. When the Si content is excessively high, characteristics of SiC such as high heat resistance and high thermal conductivity will contribute little. Therefore, the Si content is preferably in a range of 5 to 50% by mass, more preferably 10 to 40% by mass.

In a case the cell is plugged at the end face, a plugging portion preferably contains at least one, as the main crystal phase, selected from the above-described examples suitable for the main crystal phase of the partition wall, and further preferably contains the crystal phase, as the main crystal phase, similar to the main crystal phase of the honeycomb structure.

In the present invention, the outer peripheral wall is preferably made of a material containing at least one raw material selected from a group consisting of colloidal silica, colloidal alumina, ceramic fiber, and ceramic particles. The material preferably contains the particles having an average particle diameter of 0.5 to 100 μm, particularly 0.5 to 80 μm. When the outer peripheral wall is constituted of the material containing the particles in such a range, Ra of the outer peripheral surface in the axial direction can be more easily in a range of 1 to 80 μm, preferably 1 to 50 μm. The particles having such an average particle diameter are preferably ceramic particles. It is preferable that the ceramic particles form or contain at least one of crystal phase selected from the above-described examples suitable for the main crystal phase of the cell structure portion, and it is further preferable that ceramic particles contain the same type of crystal phase as that of the cell structure portion. Concretely, the examples include cordierite, mullite, alumina, aluminum titanate, lithium aluminum silicate, silicon carbide, silicon nitride, silicon carbide and the like.

The material preferably contains a fiber having an average fiber length of 10 to 100 μm, particularly 20 to 60 μm. The fiber performs a function of inhibiting shrinkage at the time of the drying of the coating material. When the average fiber length is excessively short, a crack can not be effectively inhibited due to the limited effect of the shrinkage inhibition at the time of the drying. Conversely, when the average fiber length is excessively long, it is difficult to disperse the fiber, and the fiber easily forms a so-called ball. If the ball is formed, the surface roughness Ra may exceed 80 μm. The fiber is preferably a ceramic fiber. The examples of the ceramic fiber include fibers such as silica, alumina, and alumino silicate.

The material further preferably contains colloidal silica and/or colloidal alumina in addition to the ceramic particles, further preferably contains the ceramic fiber, and still further preferably contains an inorganic binder.

There is no particular restriction as to the thickness of the partition wall in the honeycomb structure of the present invention, and the thickness can be in a range of, for example, 30 to 2000 μm, preferably 40 to 1000 μm, further preferably 50 to 500 μm. The partition wall is preferably porous, and a porosity of, for example, 30 to 90% by volume is preferable. There is no particular restriction as to the cell density (the number of cells per unit sectional area). For example, the cell density can be in a range of 6 to 2000 cells/square inch (0.9 to 311 cells/cm$^2$), preferably 50 to 1000 cells/square inch (7.8 to 155 cells/cm$^2$), further preferably 100 to 400 cells/square inch (15.5 to 62.0 cells/cm$^2$). There is no particular restriction as to the sectional shape of cell, and the sectional shape is preferably any of a triangle, a tetragon, a hexagon and a corrugated shape from the standpoint of honeycomb segment production. There is no particular restriction as to the sectional shape of the honeycomb structure, and the sectional shape can be circular as shown in, for example, FIG. 1, oval, a race truck, elliptic, polygonal (e.g. triangular, substantially triangular, tetragonal or substantially tetragonal), or an irregular shape.

In the honeycomb structure of the present invention, a catalyst such as a metal having a catalytic function may be loaded. When the catalyst is loaded, the structure can be used in purifying an exhaust gas as a catalyst carrier of a heat engine such as an internal combustion engine or a combustion device such as a boiler, or in reforming a liquid or gas fuel. When the structure is used as a filter such as DPF, a catalyst may be loaded on the structure to promote removal of a substance accumulated in the filter by combustion or the like. The representative examples of the metal having the catalytic function include Pt, Pd, Rh, and the like.

As shown in FIG. 3, the honeycomb structure of the present invention is preferably held in the can 10 via the holding member 16 and used. In this case, for example, the ceramic fiber or the like is preferably used as the holding member, and a ceramic fibrous mat is further preferable. The concrete examples of the ceramic fibrous mat include a non-intumescent mat containing an alumina or mullite as a major component, an intumescent mat containing vermiculite, and the like. The can 10 is preferably formed of a metal and, for example, a stainless steel or the like is preferably used.

Next, an example of a preferred process for manufacturing the honeycomb structure of the present invention will be described. First, a forming material is turned into clay by a clay preparation step. The clay preparation step can be conducted by adding a binder such as methyl cellulose and hydroxypropoxyl methyl cellulose to the material for forming the above-described main crystal phase of the partition wall such as a cordierite forming material or a silicon carbide powder and a metal silicon powder for forming the silicon carbide-metal silicon composite phase, and further adding a surfactant and water, kneading them to obtain the clay. Here, the cordierite forming material is a material which turns into cordierite by the firing, and the examples include a mixture selected among talc, kaolin, calcinated kaolin, alumina, aluminum hydroxide, and silica mixed at a predetermined ratio such that a chemical composition in the mixture is in a range of 42 to 56% by mass of $SiO_2$, 30 to 45% by mass of $Al_2O_3$, and 12 to 16% by mass of MgO.

Next, the clay is extruded in a forming step to form a formed body having a honeycomb shape including the partition walls arranged so as to form a plurality of cells extending through the axial direction. There is no particular restriction as to the shape of the formed body, and the body can be formed, for example, in a quadratic prism shape or a columnar shape. A plunger type extruder, a twin screw type continuous extruder, and the like can be used for the extrusion. When the twin screw type continuous extruder is used, the clay preparation step and forming step can continuously be carried out.

Next, the obtained formed body is dried, for example, by microwaves, dielectric heating and/or hot air, and subsequently fired by a firing step to obtain a fired honeycomb body. A firing temperature and atmosphere in the firing step can be changed appropriately in accordance with the material used, and any person skilled in the art can select the firing temperature and atmosphere optimum for the material used. For example, when the cordierite forming material is used, the formed body is heated to degrease in the air, subsequently fired in the air at a maximum temperature of about 1400 to 1450 degree C. When the silicon carbide powder and metal silicon powder are used as the material, the formed body can be heated to degrease in the air or an $N_2$ atmosphere, subsequently fired in an Ar atmosphere at about 1550 degree C. A shuttle kiln or a continuous furnace such as a tunnel kiln is generally used in the firing, and the degreasing and firing can be carried out in the furnace at the same time.

Next in a removing step, at least a part of the outer periphery of the fired body is removed to form the cell structure portion. Since the cells in the vicinity of an outermost periphery are often deformed in the previous steps, the deformed cells are preferably removed. Concretely, for example, preferably two or more cells, further preferably two to four cells from the outermost periphery are removed. Here, the removing the cells means that the cells are not completely surrounded with the partition walls at four sides as shown in FIG. 4(*a*) by removing some part of the partition walls which form the cells. The removal can be carried out, for example, by grinding the fired body from the outer periphery.

Next, a coating step is carried out by coating at least a part of the outer periphery of the cell structure portion with a coating material to form the outer peripheral wall. The coating material preferably contains at least one of colloidal silica, colloidal alumina, ceramic fiber, and ceramic particle. The coating material preferably contains particles having an average particle diameter of 0.5 to 100 μm, particularly 0.5 to 80 μm. By the use of the particles in such range, Ra in the axial direction of the outer peripheral surface of the formed outer peripheral wall can be easily in a range of 1 to 80 μm, preferably 1 to 50 μm. The particles having such an average particle diameter are preferably ceramic particles. Furthermore, the coating material preferably contains a fiber having an average fiber length of 10 to 100 μm, particularly 20 to 60 μm. By the use of the fiber in such range, the crack of the formed outer peripheral wall can be inhibited, and Ra in the outer peripheral surface can be set to 80 μm or less. Such a fiber is preferably a ceramic fiber.

It is preferable that the ceramic particles form or contain at least one of crystal phase selected from the above-described examples suitable for the main crystal phase of the cell structure portion, and it is further preferable that ceramic particles contain the same type of crystal phase as that of the cell structure portion. Concretely, the examples include cordierite, mullite, alumina, aluminum titanate, lithium aluminum silicate, silicon carbide, silicon nitride, silicon carbide and the like.

The coating material preferably contains colloidal silica and/or colloidal alumina in addition to the ceramic particles, further preferably contains the ceramic fiber, still further preferably contains the inorganic binder, and still further preferably contains an organic binder. The coating material is preferably applied as the slurry which is obtained by adding liquid components such as water to the coating material. Moreover, it is preferable to heat the coating material to dry after applying it in order to form the outer peripheral wall by evaporating the liquid components in an early stage. Especially, when the coating material is dried at a temperature of 150 degree C. or more, the strength of the outer peripheral wall can be increased.

Figure 2:
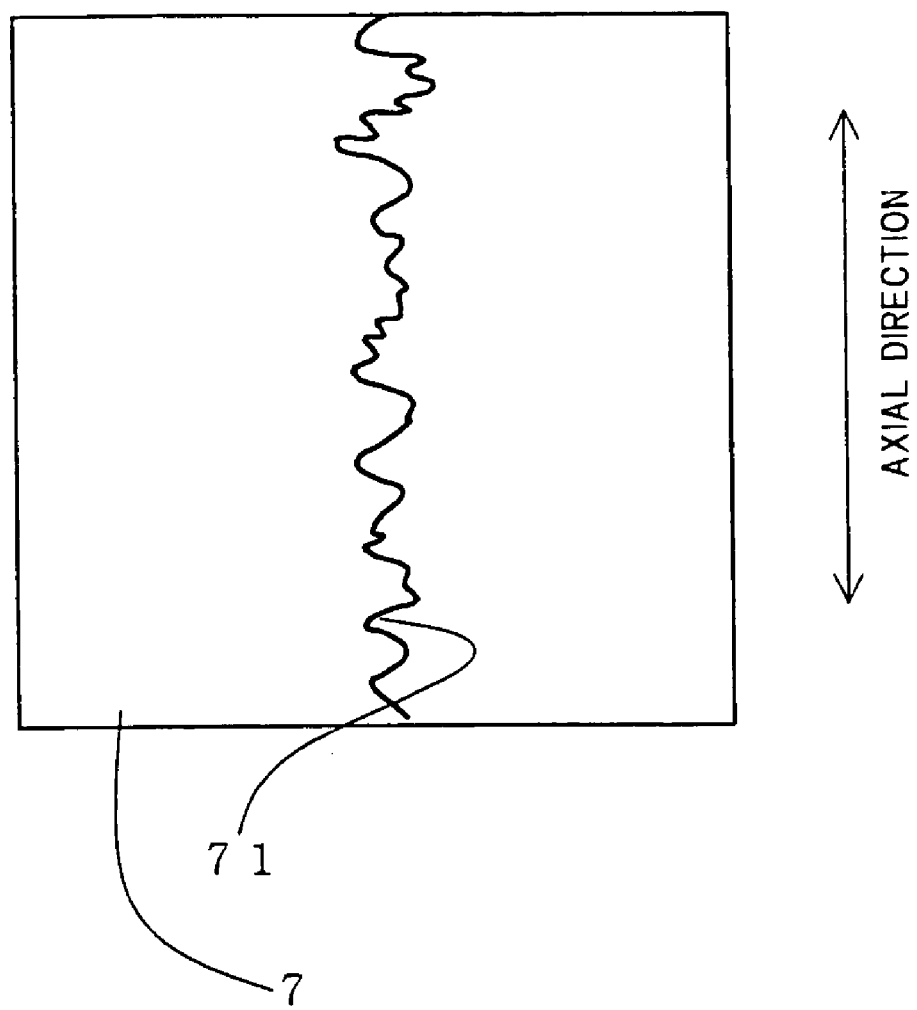
FIG. 2 is a schematic enlarged view of the portion II of FIG. 1(a).

Here, as shown in FIG. 2, the outer peripheral wall is formed so that Ra in the outer peripheral surface 71 of the outer peripheral wall 7 is 1 to 80 μm. In a preferable method of setting Ra in the outer peripheral surface 71 to the above-described range, the outer peripheral wall is formed of the coating material containing the particles, preferably ceramic particles having an average particle diameter of 0.5 to 100 μm, especially 0.5 to 80 μm. The particles are preferably contained in the coating material in an amount of 10 to 70% by mass, especially 20 to 60% by mass with respect to a solid content in the coating material.

In the present invention, it is preferable to include a bonding step of bonding a plurality of formed or fired bodies, preferably fired bodies. When the bonding step is included, the formed honeycomb structure is constituted by bonding a plurality of segments which are segmented honeycomb structure, and the thermal shock resistance is enhanced. There is no particular restriction as to a bonding material for use in the bonding step and, for example, a material similar to the coating material can be used. The bonding step is preferably carried out before the removing step. That is, after bonding a plurality of formed or fired bodies in a predetermined size by the bonding step, the outer periphery is preferably removed to form the cell structure portion which has a desired shape.

Moreover, when the honeycomb structure is used as the filter, especially DPF or the like, it is preferable to plug the openings of some of the cells at the end faces with a plugging material, and the cells are preferably plugged so that adjacent cells are alternately plugged at opposite end faces to each other. Plugging can be conducted by masking cells that are not to be plugged, applying a slurry-state plugging material to each open end face of honeycomb segment, and drying and firing the resulting honeycomb segment. The plugging is preferably carried out after the forming step and before the firing step, so that the firing step can be performed only once. The plugging may also be carried out after the firing or at any time after the forming. There is no particular restriction as to a plugging material, and the material similar to the raw material for forming can be used.

The present invention is described in more detail below by way of Examples. However, the present invention is not restricted to these Examples.

(Production of Cell Structure Portion 1)

To the cordierite forming materials, that is, mixture of talc, kaolin, alumina, and silica at the above-described predetermined ratio, graphite and foamed resin were added as a pore-forming material, and the binder was added to obtain the material for forming. The material was kneaded to obtain the clay. The clay was extruded to form a formed body having a columnar shape with a diameter of 160 mm and length of 152 mm, including the outer peripheral wall and the partition wall with a thickness of 300 μm, and having a cell density of 30 cells/cm$^2$. Next, after plugging the cells at the end faces so that adjacent cells are alternately plugged at opposite end faces to each other, the resultant was fired at 1420 degree C. to obtain Fired Body 1. The Cell Structure Portion 1 made of cordierite was produced by grinding the entire outer periphery of Fired Body 1 so that a line connecting the outermost periphery of the partition wall was circular with a diameter of 152 mm.

(Production of Cell Structure Portion 2)

As the raw material, 75 parts by mass of silicon carbide powder and 25 parts by mass of silicon powder were mixed, and methyl cellulose, hydroxypropoxyl methyl cellulose, surfactant, and water were added to the mixture. The obtained material for forming was kneaded to provide the clay. The clay was extruded to form a formed body having a square end face of 35×35 mm, having a quadratic prism shape with a length of 152 mm, having the outer peripheral wall and partition walls with a thickness of 300 μm, and having a cell density of 30 cells/cm$^2$. Next, after plugging the cells at the end faces so that adjacent cells are alternately plugged at opposite end faces to each other, the resultant was fired at 1450 degree C. to obtain Fired Body 2. The Cell Structure Portion 2 made of Si—SiC was produced by grinding the entire outer periphery of the bonded body so that the line connecting the outermost periphery of the partition walls was circular with a diameter of 152 mm after bonding 16 Fired Bodies 2 to one another.

EXAMPLE 1

For Cell Structure Portion 1, a slurry containing 45 parts by mass of cordierite particles having an average particle diameter of 20 μm, 20 parts by mass of colloidal silica, 35 parts by mass of ceramic fiber having an average fiber length of 20 μm, and a small amount of inorganic and organic binders was prepared as the coating material, and the entire outer periphery of the Cell Structure Portion 1 was coated with the coating material and dried at 200 degree C. to obtain the columnar Honeycomb Structure A with a diameter of 154 mm.

EXAMPLE 2

For Cell Structure Portion 2, a slurry containing silicon carbide particles having an average particle diameter of 1.5 μm, colloidal silica, ceramic fiber having an average fiber length of 60 μm, and inorganic and organic binders was prepared as the coating material in the same manner as in Example 1, and the entire outer periphery of the Cell Structure Portion 2 was coated with the coating material and dried at 200 degree C. to obtain the columnar Honeycomb Structure B with a diameter of 154 mm.

EXAMPLES 3 to 5

The honeycomb structure was obtained in the same manner as in Example 1 or 2 except that the ceramic particles having the average particle diameter and type shown in Table 1 and the ceramic fiber having the average fiber length and type also shown in Table 1 were used to obtain the coating material.

Comparative Examples 1 to 4

The honeycomb structure was obtained in the same manner as in Example 1 or 2 except that the ceramic particles having the average particle diameter and type shown in Table 1 and the ceramic fiber having the average fiber length and type also shown in Table 1 were used to obtain the coating material.

The cracks of the outer peripheral wall of each obtained honeycomb structure were observed. The surface roughness was measured with a length of 0.8 mm in the axial direction by ISO4287/1 in five positions to calculate Ra. A 5.5 mm thick non-intumescent mat was placed around the outer periphery of each honeycomb structure, the structure was held in a can having an inner diameter of 162 mm by pressing the structure into the can with the mat, and was actually installed to an exhaust line from an engine, the engine was operated to conduct a vibration test, and the state of the honeycomb structure after the vibration test was observed.

Results are shown in Table 1. For the honeycomb structure obtained in Comparative Example 1 in which Ra in the axial direction was 1 μm or less, the positional deviation in the axial direction was observed after the engine test.

For the honeycomb structures obtained in Comparative Examples 2 and 4 in which Ra in the axial direction were 100 μm or more, the outer peripheral portion peeled. For Comparative Example 3, since Ra in the axial direction was in the range of the present invention, neither the positional deviation nor the peeling of the outer peripheral portion occurred. Although this can be an example in this sense, the cracks were observed on the outer peripheral wall because of an average fiber length of 5 μm. On the other hand, for the honeycomb structures obtained in Examples 1 to 5 whose Ra in the axial direction is in the range of the present invention, the positional deviation of the honeycomb structure or the peeling of the outer peripheral portion or the cracking of the outer peripheral portion did not occur.

TABLE 1

| | Material of honeycomb structure | Particle diameter of ceramic particles (μm) | Type of ceramic particles | Fiber length of ceramic fiber (μm) | Type of ceramic fiber | Ra in X-axis direction (μm) | State after vibration test | Appearance of outer peripheral wall |
|---|---|---|---|---|---|---|---|---|
| Example 1 | Cordierite | 20 | Cordierite | 20 | Alumino silicate | 26 | No positional deviation | No cracks |
| Example 2 | Si—SiC | 1.5 | SiC | 60 | Alumino silicate | 5.8 | No positional deviation | No cracks |
| Example 3 | Cordierite | 0.9 | Cordierite | 10 | Alumino silicate | 1.2 | No positional deviation | No cracks |
| Example 4 | Cordierite | 51 | Cordierite | 90 | Alumino silicate | 47 | No positional deviation | No cracks |
| Example 5 | Si—SiC | 97 | SiC | 50 | Alumino silicate | 78 | No positional deviation | No cracks |
| Comparative Example 1 | Si—SiC | 0.6 | SiC | 20 | Alumino silicate | 0.8 | Positional deviation | No cracks |
| Comparative Example 2 | Cordierite | 110 | Cordierite | 60 | Alumino silicate | 85 | Outer peripheral portion peel | No cracks |
| Comparative Example 3 | Si—SiC | 1.5 | SiC | 5 | Alumino silicate | 2.7 | No positional deviation | Cracks |
| Comparative Example 4 | Cordierite | 20 | Cordierite | 120 | Alumino silicate | 103 | Outer peripheral portion peel | No cracks |

INDUSTRIAL APPLICABILITY

As described above, the honeycomb structure of the present invention does not easily cause a positional deviation, peeling or cracking, and can be used preferably in various applications such as a filter and a catalyst carrier. The above-described honeycomb structure can be preferably produced by a process for production of the honeycomb structure of the present invention.

The invention claimed is:

1. A honeycomb structure comprising:
a cell structure portion constituted of partition walls arranged so as to form a plurality of cells extending through an axial direction; and
an outer peripheral wall disposed in an outer periphery of the cell structure portion, the outer peripheral wall being formed from a ceramic fiber having a length of 10 to 100 μm, an inorganic binder, and an organic binder, wherein a surface roughness Ra of an outer peripheral surface of the outer peripheral wall is in a range of 1 to 80 μm.

2. The honeycomb structure according to claim 1, wherein the surface roughness Ra is in a range of 1 to 50 μm.

3. The honeycomb structure according to claim 1, wherein the surface roughness Ra is a surface roughness of the outer peripheral surface in the axial direction.

4. The honeycomb structure according to claim 1, wherein at least a part of an inner peripheral surface of the outer peripheral wall is closely attached to a partition wall surface.

5. The honeycomb structure according to claim 4, wherein the cell structure portion is monolithically formed, and the outer peripheral wall is disposed in at least a part of the outer periphery of the cell structure portion.

6. The honeycomb structure according to claim 5, wherein the outer peripheral wall is made of a material containing at least one raw material selected from a group consisting of colloidal silica, colloidal alumina, ceramic fiber, and ceramic particles.

7. The honeycomb structure according to claim 4, wherein the cell structure portion is formed of a plurality of separately formed segments, and the outer peripheral wall is disposed in at least a part of the outer periphery of the cell structure portion.

8. honeycomb structure according to claim 7, wherein the outer peripheral wall is made of a material containing at least one raw material selected from a group consisting of colloidal silica, colloidal alumina, ceramic fiber, and ceramic particles.

9. The honeycomb structure according to claim 1, wherein the cell structure portion is monolithically formed, and the outer peripheral wall is disposed in at least a part of the outer periphery of the cell structure portion.

10. The honeycomb structure according to claim 1, wherein the cell structure portion is formed of a plurality of separately formed segments, and the outer peripheral wall is disposed in at least a part of the outer periphery of the cell structure portion.

11. The honeycomb structure according to claim 1, wherein some of the cells are plugged in an end face of the honeycomb structure.

12. The honeycomb structure according to claim 1, wherein a main crystal phase of the cell structure portion is at least one selected from a group consisting of cordierite, mullite, alumina, aluminum titanate, lithium aluminum silicate, silicon carbide, silicon nitride and a silicon carbide-metal silicon composite phase.

13. The honeycomb structure according to claim 1, wherein the outer peripheral wall is made of a material containing at least one raw material selected from a group consisting of colloidal silica, colloidal alumina, ceramic fiber, and ceramic particles.

* * * * *